Patented June 5, 1923.

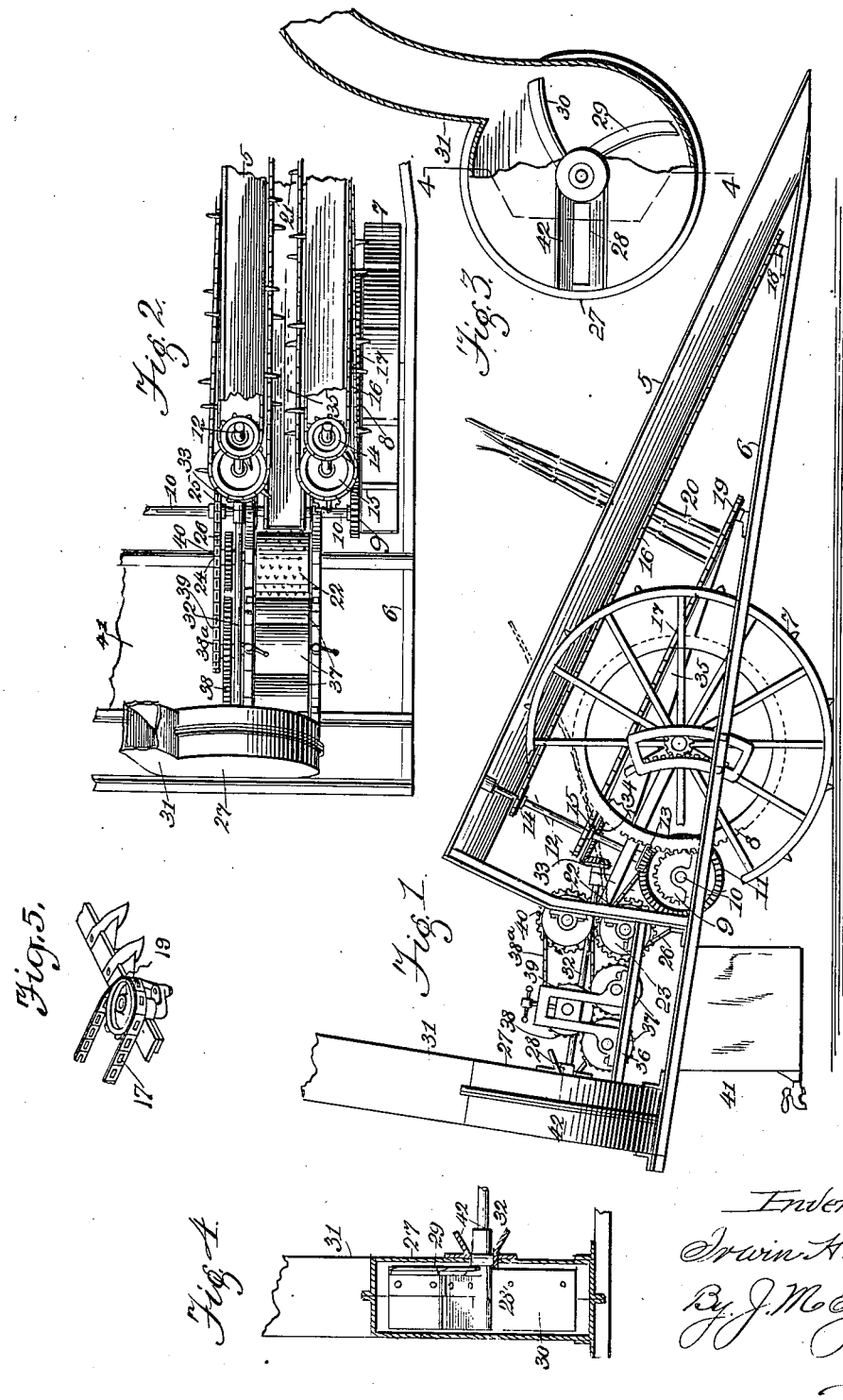

1,457,828

UNITED STATES PATENT OFFICE.

IRWIN H. ERB, OF LAKE MILLS, IOWA, ASSIGNOR OF THREE-FOURTHS TO CLAUDE C. HOBSON, OF RYAN, IOWA, AND OTA O. HOBSON, OF VINTON, IOWA.

JUICE-EXTRACTING ENSILAGE HARVESTER.

Application filed March 24, 1921. Serial No. 455,006.

*To all whom it may concern:*

Be it known that I, IRWIN H. ERB, a citizen of the United States, residing at Lake Mills, in the county of Winnebago and State of Iowa, have invented certain new and useful Improvements in Juice-Extracting Ensilage Harvesters; and I do hereby declare the following to be a full, clear, and exact description of the invention, such as will enable others skilled in the art to which it appertains to make and use the same.

This invention relates to the harvesting of saccharine canes, more especially sorghum, and the object of the invention is to provide means for simultaneously harvesting the cane, crushing it and extracting the juice, and reducing the stover to ensilage.

The nature of the invention is fully disclosed in the description and claims following, reference being had to the accompanying drawing, in which:—

Fig. 1 is a side elevation of an ensilage harvester embodying my improvements. Fig. 2 is a partial plan view of the same. Fig. 3 is a side elevation, partly in section, of a combined cutter and blower for disposing of the stover. Fig. 4 is a vertical cross-section of the same in the line 4—4 of Fig. 3. Fig. 5 is a fragmentary view in perspective of apparatus for cutting the standing stalks.

In the drawing is shown a harvester of a type used for cutting and gathering corn, cane, and the like. This has the usual gathering boards 5 carried by a frame 6 mounted on carrying and traction wheels 7, of which but one is shown. This is the driving traction-wheel, and carries a large spur-gear 8 meshing with a pinion 9 on a cross-shaft 10. A bevel-gear 11 transmits motion to an upstanding shaft 12 by a pinion 13. To this shaft are connected sprockets 14 and 15, the lower one being considerably larger than the other, and carrying chains 16 and 17 respectively. These pass around idlers 18 and 19, and the lower one is understood to transmit motion to a suitable cutting apparatus for severing the standing stalks 20, as shown in Fig. 5, which illustrates conventionally cutting apparatus of a type so familiar as to need no description. The chains are provided with lateral fingers 21 to engage the stalks and draw them backwardly as severed. It will be evident that the lower chain travels faster than the upper one, with the result of advancing the butts of the stalks faster than the tips, so as to present them in a nearly horizontal position, as indicated in dotted outline, to a pair of feed-rolls 22 and 23 driven suitably from the cross-shaft, as by sprockets 24 and 25 and chain 26. These rolls, ordinarily, pass the stalks back to a combined cutter and blower 27, through a throat 28 in one side thereof. The bottom of the throat serves as the ledger-blade of the cutter, the moving blades 29 being mounted to arms of the blower, which are also provided with suitable fan-blades or wings 30. Through a curved outlet-pipe 31 the finely chopped material is blown over to a receiving wagon, not shown, which in practice travels alongside of the harvester. This chopper is herein shown as driven by a shaft 32 engaging by a bevel pinion 33 a bevel-gear 34 on one of the upstanding shafts above referred to. The stalks are supported in their movement back toward the feed-rolls by a trough-like chute 35.

In the harvesting of sorghum for ensilage it is desirable to extract the saccharine juice, both for its own value in the production of syrup, and to prevent the ferment which the presence of any considerable amount of such saccharine material would tend to create in the silo. This is the principal object of this invention, and the means whereby it is accomplished will now be described.

On a suitable supporting part 36 of the main frame, extending between the feeding rolls and the chopper, is mounted a set of juice-expressing rolls 37, preferably three in number. These are geared together at 38 to impart rearwardly impelling movement to all the rolls, and the two lower rolls are separated somewhat, thus permitting the expressed juice to flow between them. The rolls may be driven in any suitable way, a simple drive being shown as a chain 38ª over sprockets 39 and 40, the latter being connected with the upper feed-roll. To the frame beneath the rolls is hung a tank 41, which receives the juice as so expressed. These rolls are geared to run at the same rate of speed as the feed-rolls, and project the crushed cane, or "stover" into the mouth of the rapidly revolving chopper, which has a hopper-like opening 42, as shown. The tank, as filled, is supposed to be emptied into some general conveyance, and thence taken to the evaporating plant.

The machine is thus designed to eliminate the usual labor of cutting, loading and hauling the cane to a mill, the whole operation being performed automatically in the field. It also reduces the stover, usually a waste product, into silage having a food value fairly comparable with corn-stalks and the like, and is therefore economical of labor, time and material.

Having thus described my invention, I claim:

1. In a silage harvester having feed-rolls for advancing the severed stalks, a chopper to cut the stalks into short pieces, a set of juice-expressing rolls disposed between the feed-rolls and the chopper, and means for actuating the feed-rolls, juice-expressing rolls and chopper concurrently.

2. In a silage harvester having feed-rolls for advancing the severed stalks, a rotary chopper and blower to cut and discharge said stalks, and a set of juice-expressing rolls disposed between the feed rolls and the chopper, with mechanism adapted to impart concurrent motion to the feed-rolls, juice-expressing rolls and chopping and discharging blower.

In testimony whereof I affix my signature in presence of two witnesses.

IRWIN H. ERB.

Witnesses:
 ARCHIE R. NELSON,
 EDWARD BRATTRUD.